United States Patent
Sakai et al.

[11] Patent Number: 5,283,669
[45] Date of Patent: Feb. 1, 1994

[54] READING APPARATUS USING TWO READOUT CIRCUITS CONNECTED IN REVERSE ORDER

[75] Inventors: Kazuhiro Sakai; Mamoru Nobue, both of Kanagawa, Japan

[73] Assignee: Fuji Xerox Co., Ltd., Tokyo, Japan

[21] Appl. No.: 727,906

[22] Filed: Jul. 10, 1991

[30] Foreign Application Priority Data

Aug. 6, 1990 [JP] Japan .................. 2-208742

[51] Int. Cl.[5] .............................. H04N 1/024
[52] U.S. Cl. ...................... 358/482; 358/483; 348/294
[58] Field of Search ............. 358/482, 483, 213.11, 358/213.15, 213.22, 213.23, 213.26, 213.27, 213.29; 250/552, 553; H04N 3/14, 1/024

[56] References Cited

U.S. PATENT DOCUMENTS

| | | | |
|---|---|---|---|
| 4,539,596 | 9/1985 | Elabd | 358/213.25 |
| 4,597,012 | 6/1986 | Hoh et al. | 358/482 |
| 4,772,958 | 9/1988 | Suzuki | 358/483 |
| 5,027,226 | 6/1991 | Nagata et al. | 358/482 |
| 5,148,013 | 9/1992 | Yamada | 358/213.23 |

FOREIGN PATENT DOCUMENTS 64-5057 1/1989 Japan .
64-5173 1/1989 Japan .

Primary Examiner—Stephen Brinich
Assistant Examiner—Jill Jackson
Attorney, Agent, or Firm—Finnegan, Henderson, Farabow, Garrett & Dunner

[57] ABSTRACT

A reading apparatus having a photo-detecting element array constituted by a plurality of photo-detecting element blocks each constituted by a plurality of photo-detecting elements, and having switching elements for transferring charges generated in the photo-detecting elements block by block to an output circuit, in which the output circuit has wirings having no crossing portions and the outputs of the photo-detecting elements can be produced as time-series signals without requiring any external memory. In the reading apparatus, the switching elements are selected block by block of the photo-detecting element array, the blocks are commonly connected so that the respective orders of adjacent two of the blocks in the output circuit are opposite to each other, and an output of the output circuit is selected by two selection circuits synchronized with the selection of the switching elements, the two selection circuits respectively having selection orders which are opposite to each other, whereby the selection circuits are switched block by block of the photo-detecting element array to thereby obtain a time-series output.

4 Claims, 7 Drawing Sheets

READING APPARATUS USING TWO READOUT CIRCUITS CONNECTED IN REVERSE ORDER

BACKGROUND OF THE INVENTION

The present invention relates to a reading apparatus for use in a facsimile equipment, a scanner, or the like.

Conventionally, a thin film transistor (TFT) matrix-driven image sensor, known as a contact-type image sensor, is used in a reading apparatus.

The image sensor is configured such that image information of an original or the like that is projected on a photo-detecting element array of the image sensor generates charges in the photo-detecting elements. The charges are temporarily stored in capacitors associates with the photo-detecting elements and the stored charges are read out in time series by using TFT switches. An equivalent circuit of an example of the image sensor is shown in FIG. 8. Photo-detecting elements are grouped into m blocks so that n photo-detecting elements are assigned to each block. That is, photo-detecting elements $P_{11}$-$P_{1n}$ constitutes a first block, photo-detecting elements $P_{21}$-$P_{2n}$ constitutes a second block. The same rule applies correspondingly to the following blocks and, finally, photo-detecting elements $P_{m1}$-$P_{mn}$ constitutes an m-th block. The respective outputs of the photo-detecting elements are connected to the drains of corresponding TFTs which are used as switching elements, that is, $T_{11}$-$T_{1n}$, $T_{21}$-$T_{2n}$, . . . , $T_{m1}$-$T_{mn}$. The respective sources of the TFTs are connected to common output lines $S_1$, $S_2$, . . . , $S_n$ respectively so that the sources of the TFTs having the same order in the respective blocks are connected to one and the same output line. The respective gates of the switching elements $T_{11}$-$T_{1n}$, $T_{21}$-$T_{2n}$, . . . , $T_{m1}$-$T_{mn}$ are connected to a gate pulse generation circuit 14 through common signal lines $G_1$, $G_2$, . . . , $G_m$ provided for every block. There exist inter-line capacities $C_1$, $C_2$, . . . , $C_n$ in the common output lines $S_1$, $S_2$, . . . , $S_n$, and those capacities are respectively connected to the drains of corresponding selection switches $SW_1$, $SW_2$, . . . , $SW_n$ each constituted by an FET. The sources of the selection switches $SW_1$, $SW_2$, . . . , $SW_n$ are commonly connected to an output line COM, and the gates of those switches are connected to a selection pulse generation circuit 15.

The switching operation will now be described. Gate pulse generation circuit 14 operates to turn-on the switching elements of a block. The output signals on the common output line are successively selected by the reading signal of the selection pulse generation circuit 15 in synchronism with generation of a gate pulse. For example, first, a gate pulse is outputted from the gate pulse generation circuit 14 onto the signal line $G_1$. As a result, the switching elements $T_{11}$-$T_{1n}$ of the first block are turned on, so that the respective outputs of the photo-detecting elements $P_{11}$-$P_{1n}$ are connected to the common output lines $S_1$, $S_2$, . . . , $S_n$ and stored in the line capacities $C_1$, $C_2$, . . . , $C_n$. The selection switches $SW_1$, $SW_2$, . . . , $SW_n$ are successively turned-on by the reading signal of the selection pulse generation circuit 15 to thereby output the output signals stored in the line capacities $C_1$, $C_2$, . . . , $C_n$, that is, the outputs of the first block, onto the output line COM as a time-series signal. Next, a gate pulse is outputted from the gate pulse generation circuit 14 onto the signal line $G_2$ so that the switching elements $T_{21}$-$T_{2n}$ of the second block are turned on to thereby connect the outputs of the photo-detecting elements $P_{21}$-$P_{2n}$ to the common output lines $S_1$, $S_2$, . . . , $S_n$ respectively. Then selection switches $SW_1$, $SW_2$, . . . , $SW_n$ are successively turned-on on the basis of the reading signal of the selection pulse generation circuit 15 to thereby output the outputs of the second block onto the output line COM as a time-series signal. The same rule applies correspondingly to the following till the outputs of the m-th block are outputted onto the output line COM as a time-series signal. Thus, image information for one line of an original is read. While performing sub-scanning, the above operation is repeated till the image information of the whole original has been read as a time-series signal.

As described above, in the reading apparatus in which the output of the photo-detecting array is read in matrix, there is a problem in the wiring of the output circuit. As seen from FIG. 8, crossing portions are formed in the output lines of the respective sources of the switching elements $T_{11}$-$T_{1n}$, $T_{21}$-$T_{2n}$, . . . , $T_{m1}$-$T_{mn}$ and the common output lines $S_1$, $S_2$, . . . , $S_n$. Although at the crossing portions an insulating layer is interposed between the output lines, there has been a problem in that crosstalk may be generated between the signal lines by electrostatic capacities formed at the crossing portions so that charges cannot be read correctly.

As the method of solving this problem, there has been proposed such means in which a ground layer is interposed at the crossing portions where output lines cross in matrix, as disclosed, for example, in Japanese Patent Unexamined Publication Nos. Sho-64-5057 and Sho-64-5173. In such a method, however, there has been the disadvantage of an increase in the electrostatic capacities of the wiring, thus reducing sensitivity. Further, there has been the disadvantage of remarkable unevenness in crossing portions, thus a high yield in the production process cannot be achieved.

SUMMARY OF THE INVENTION

The present invention has been accomplished to solve the foregoing problems in the conventional apparatus and to provide a reading apparatus having a photo-detecting element array constituted by a plurality of photo-detecting element blocks each constituted by a plurality of photo-detecting elements, and having switching elements for transferring charges generated in the photo-detecting elements, block by block to an output circuit, in which the output circuit wiring has no crossing portions and the outputs of the photo-detecting elements can be produced as time-series signals without requiring any external memory.

According to the present invention, the reading apparatus having a photo-detecting element array constituted by a plurality of photo-detecting element blocks each constituted by a plurality of photo-detecting elements, and having switching elements for transferring charges generated in the corresponding photo-detecting elements of each block to an output circuit, is characterized in that the switching elements are selected block by block of the photo-detecting element array, in that the blocks are commonly connected such that the respective orders of the picture elements in adjacent blocks in the output circuit are reverse of each other, and in that an output of the output circuit is selected by two selection circuits synchronized with the selection of the switching elements, the two selection circuits respectively having order of selection that are reverse of each other, whereby the selection circuits are switched block by block of the photo-detecting element array to thereby obtain a time-series output.

According to the present invention, in a reading apparatus having a photo-detecting element array constituted by a plurality of photo-detecting element blocks each constituted by a plurality of photo-detecting elements, and having switching elements for transferring charges generated in the corresponding photo-detecting elements of each block to an output circuit, the switching elements are selected one block at a time, the blocks are commonly connected so that the respective order of the picture elements in adjacent blocks in the output circuit are reverse of each other, and an output of the output circuit is selected by two selection circuits synchronized with the selection of the switching elements, the two selection circuits respectively having order of selection which are opposite to each other, whereby the selection circuits are switched block by block of the photo-detecting element array to thereby obtain the respective outputs of all the blocks in the same order as the order of arrangement of the photo-detecting element array, in the form of a time-series output.

PREFERRED EMBODIMENT OF THE INVENTION

Figure 8:
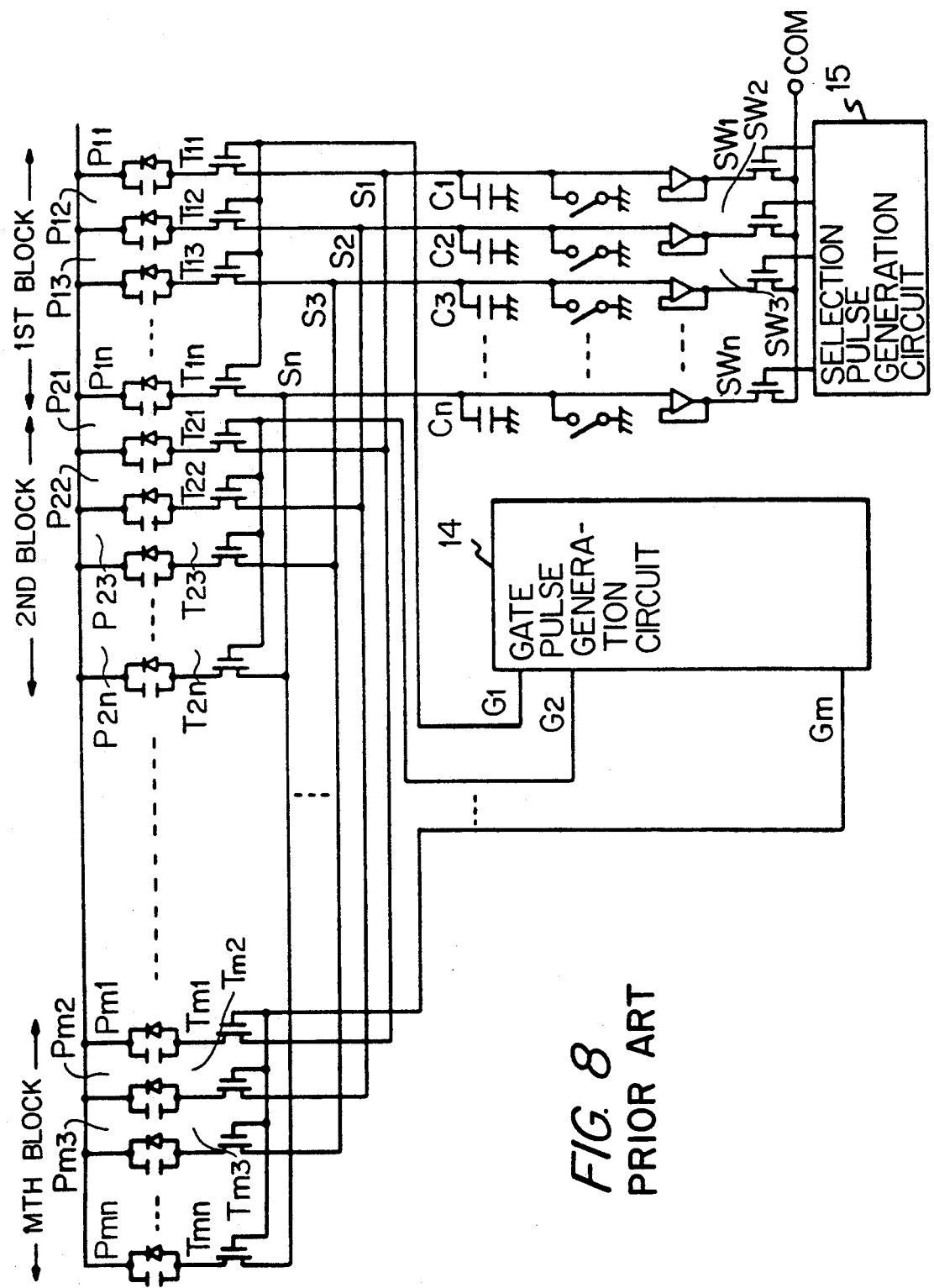
FIG. 8 is a circuit diagram for schematically explaining an example of the conventional reading apparatus.
Figure 9:
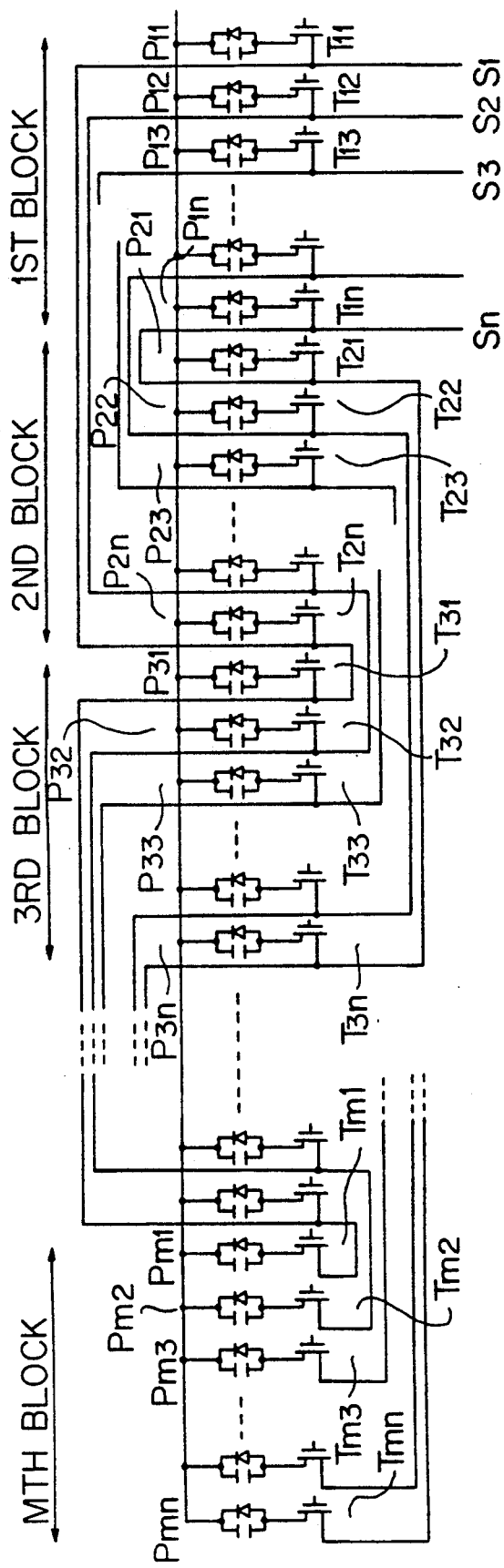
FIG. 9 is a circuit diagram for explaining an example of wirings of an output circuit of photo-detecting elements to which the present invention is to be applied.

FIG. 9 shows a circuit diagram for explaining an example of the wirings in an output circuit of photo-detecting elements to which the present invention is to be applied. Since the gate circuit of the switching elements for switching the outputs of the photo-detecting elements is the same as that shown in FIG. 8, the illustration of the gate circuit is omitted in the drawing. Portions corresponding to those of FIG. 8 are correspondingly referenced, and the description thereof is omitted. The wiring construction of this example is as follows. When the output lines in each block are connected to the output lines of an adjacent block, the output lines of the former are connected to the output lines of the latter that are in a mirror-image order to the output lines of the former as seen from FIG. 9. Further, the wirings between adjacent blocks are connected so that they are alternately disposed on the sides of the photo-detecting element array with respect to the longitudinal direction and so that wires connecting mirror-image pairs that are closest to each other are closest to the photo-detecting element array, and wires connecting mirror image pairs farther apart successively move farther from the photo-detecting element array. In this circuit, the output lines do not cross each other.

The connection of the sources of the switching elements of one block and the wiring, however, is alternately reversed compared to the adjacent block, and, therefore, output signals are not obtained in an order determined by the arrangement of the photo-detecting elements in the array, as in the case of using the selection circuit of FIG. 8. Consequently, it is necessary to provide a read-out circuit that makes a time-series of the output signals in an order determined by the arrangement of the photo-detecting elements in the array. In this case, although the output selected by the switching elements for every block are temporarily stored in an external memory (not shown), and the order of reading is controlled so as to obtain time-series signals, it is necessary to provide an excess memory.

Figure 1:
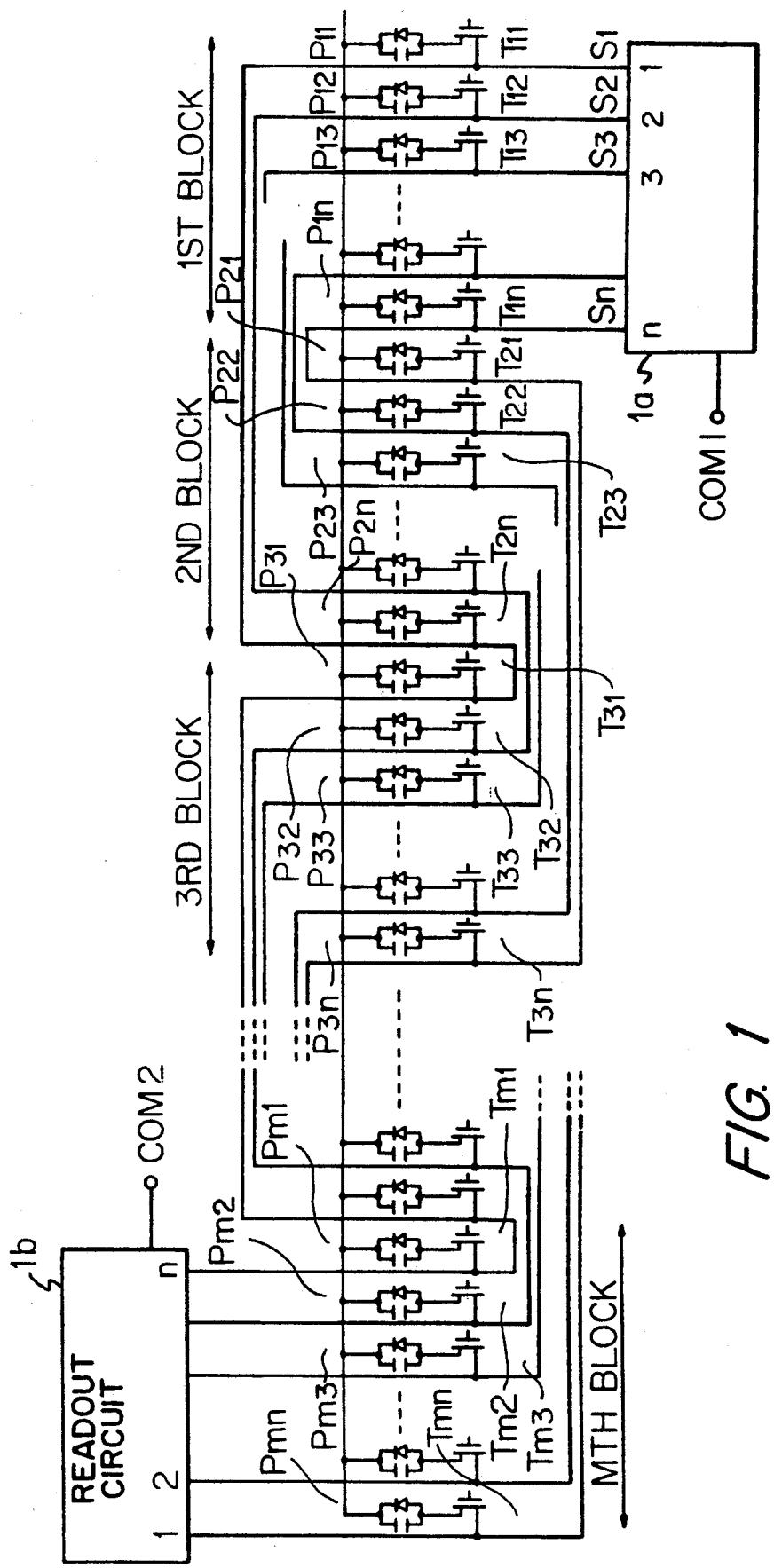
FIG. 1 is a circuit diagram for schematically explaining an embodiment of the reading apparatus according to the present invention.

FIG. 1 is an equivalent circuit diagram for schematically explaining the case where an embodiment of the reading apparatus according to the present invention is applied to a meander-type image sensor illustrated in FIG. 9. Similarly to FIG. 9, illustration of the gate circuit for the switching elements for switching the outputs of the photo-detecting elements is omitted. Portions corresponding to those of FIG. 8 are correspondingly referenced, and description of thereof is omitted.

Figure 2A:
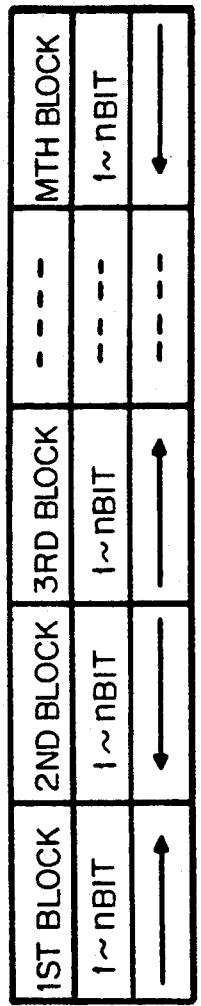
FIGS. 2a-b is a diagram for explaining the output signal of FIG. 1.
Figure 2B:
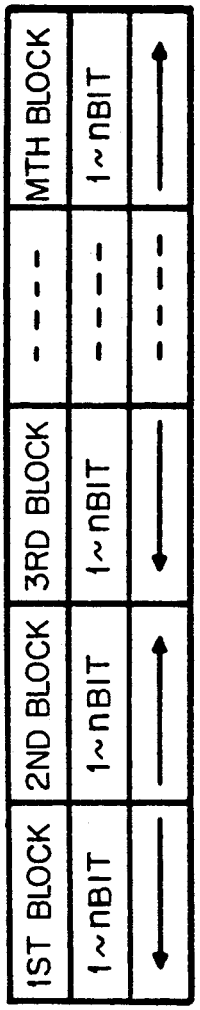

Read-out circuits 1a and 1b, each constituted by an IC, are connected by a common output lines. The output lines of the blocks are connected to corresponding common output lines. COM1 and COM2 represent output terminals of the read-out circuits 1a and 1b respectively. The read-out circuit 1a and 1b are simultaneously driven by a drive circuit (not shown). The order for reading the outputs of picture elements of 1-n bits in each of the blocks by the read-out circuits is as follows. When the number m of the block is even, the read-out direction is reversed for adjacent blocks, as shown by arrows in the diagram (A) of FIG. 2, for the output terminal COM1 and by arrows in the diagram (B) of FIG. 2 for the output terminal COM2. Thus, the respective outputs at the output terminals COM1 and COM2 are time-series signals that are opposite in direction to each other as a whole.

Figure 3:
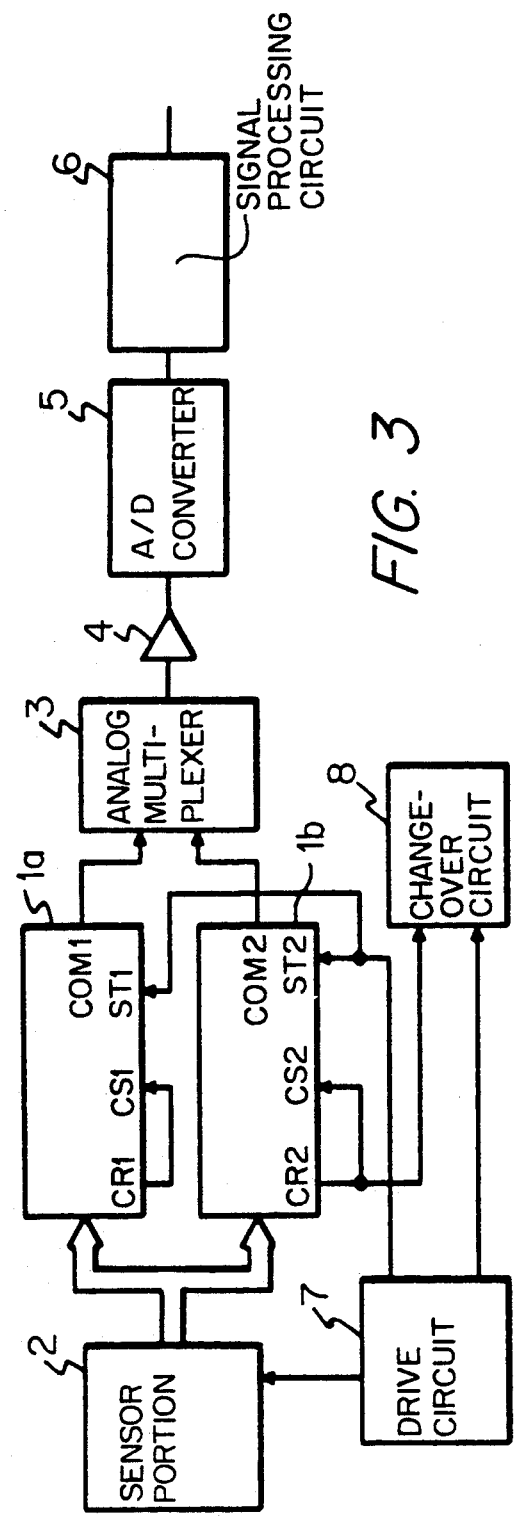
FIG. 3 is a block diagram showing an embodiment using the read-out circuits of FIG. 1.

FIG. 3 is a block diagram for explaining the operation for making all the outputs of photo-detecting elements be time-series signals by using the read-out circuits 1a and 1b in the circuit of FIG. 1. In FIG. 3, the reference numerals 1a and 1b designate read-out circuits; 2, a sensor portion including the above-mentioned photo-detecting elements, switching elements, and an output circuit; 3, an analog multiplexer; 4, a buffer amplifier; 5, an A/D conversion circuit; 6, a signal processing circuit; 7, a drive circuit; and 8, a change-over circuit. In this embodiment, the number of photo-detecting elements in each block is 64. Therefore, n in the drawing represents 64.

Figure 5:
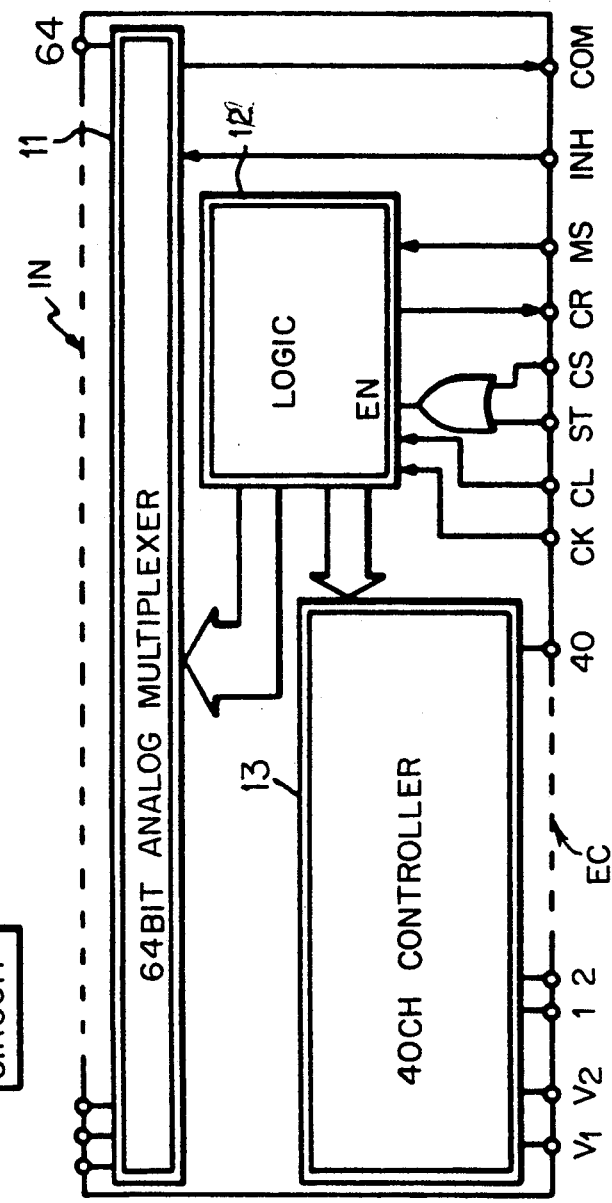
FIG. 5 is a diagram for explaining the IC constituting the read-out circuit.

Referring to FIG. 5, a specific example of the case where the read-out circuit is constituted by an IC will be described. In this example, a model HD62017E made by HITACH LTD. can be employed as an IC. In the drawing, the reference numeral 11 designates an analog multiplexer of 64 bits which selects one of analog signals applied to input terminals IN 1 –64 so as to output the selected signal to an output terminal COM, while the output terminal COM is made to have high impedance when no output exists. The reference numeral 12 designates a logic circuit having a binary up counter of 7 bits and 44 D-flip-flops so that counting is started by an input terminal EN after resetting. In this example, a 97-count pulse is used for stopping counting, and a 33-count pulse is used for signal reading-in designation. The cyclic operation is started in synchronism with a pulse applied to a start input terminal ST or a chip select input terminal CS. A delay output of a 64-clock pulse is produced from an output terminal CR after the output OR gate having input terminals ST and CS has been applied to the input terminal EN. The reference numeral 13 designates an external voltage output control portion of 40 channels constituting a shift register of 40 bits. Output channels EC are successively selected on the basis of the output of the logic circuit. The reference symbol CL designates a clear input terminal; INH, an inhibit input terminal; and MS, a mode selection terminal.

The IC of FIG. 5 is used as each of the read-out circuits 1a and 1b of FIG. 3. For explanation, numerals 1 and 2 are added to the reference symbols of the respective input and output terminals of the ICs of the read-out circuits 1a and 1b. When the output terminals CR1 and CR2 are connected to the input terminals CS1 and CS2 respectively so as to apply start inputs to the input terminal ST1 and ST2, continuous driving of a 64-clock cycle is performed. The common output lines $S_1, S_2, \ldots, S_n$ are connected successively in this order to the input terminals IN 1-64 of the read-out circuit 1a, and, on the other hand, the common output lines $S_1, S_2, \ldots, S_n$ are connected successively in the order opposite to the foregoing one to the input terminals IN 1-64 of the read-out circuit 1b.

Figure 6:
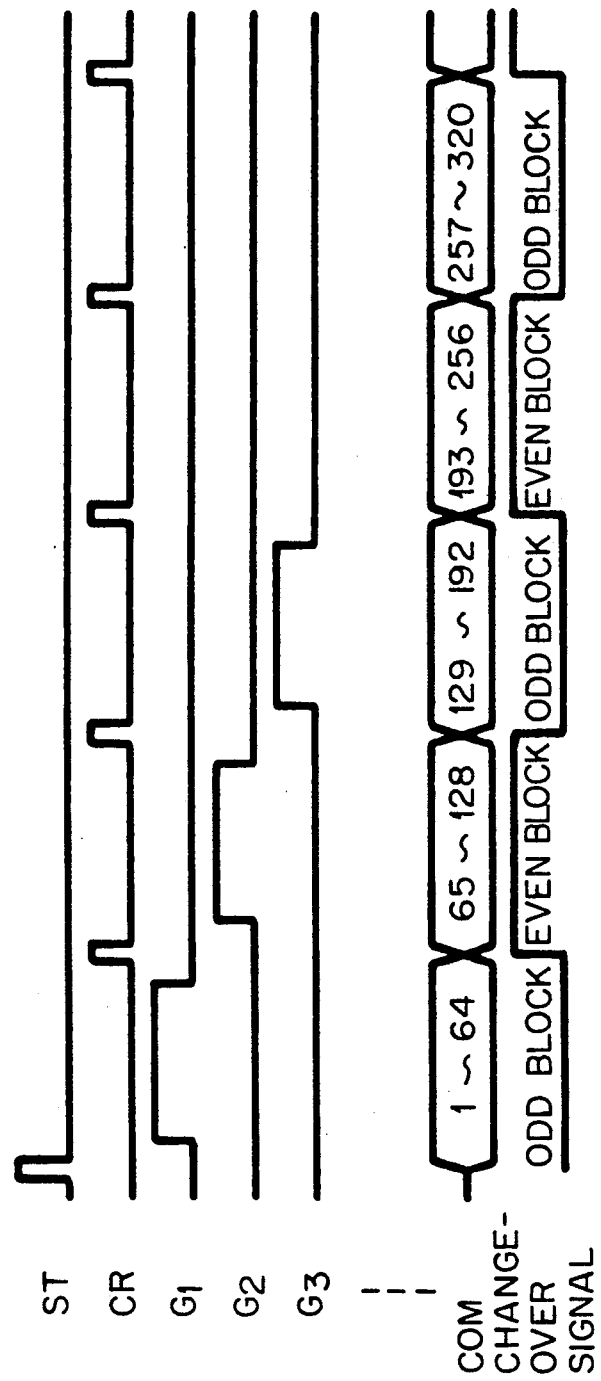
FIG. 6 is a time chart for explaining the operation of the embodiment of FIG. 3.

The operation will be described with reference to the timing chart of FIG. 6. A gate signal $G_1$ is produced from the drive circuit after the logic circuit 12 receives a start pulse ST, so that the outputs of the photo-detecting elements of the first block are applied to the common output lines $S_1, S_2, \ldots, S_n$ through the switching elements and then applied to the input terminals IN of the read-out circuits 1a and 1b. Since the start pulse is applied to the input terminals ST1 and ST2 of the read-out circuits 1a and 1b, the read-out circuits start their operations to thereby apply time-series signals to the output terminals COM1 and COM2 at the same time.

Even if the gate voltage of the switching elements is controlled so as to turn the switching elements on, the fetching of the input signals from the common output lines into the ICs and the outputting of the signals processed in the ICs cannot be performed before charges have been transferred. Therefore, actually, a certain time is required from the gating-on of the switching elements by a start input to the obtaining of the outputs to be applied to the output terminals COM1 and COM2. In this embodiment, the output is taken out with a delay time corresponding to 59-pulse count. In order to facilitate understanding, the description is made with this delay time omitted.

Although the outputs from the output terminals COM1 and COM2 are applied to the analog multiplexer 3, the signal of the change-over circuit controls the analog multiplexer 3 so as to select the output terminal COM1 in starting. Therefore, the outputs of the photo-detecting elements $P_{11}-P_{1n}$ of the first block are taken out. Upon completion of the reading of the first block, outputs are obtained in the output terminals CR1 and CR2 of the read-out circuits. At the same time, the drive circuit outputs a gate signal $G_2$ to thereby turn the switching elements of the second block on so as to obtain outputs from the output terminals COM1 and COM2 in the same manner as in the foregoing case. The output from the CR2 terminal, however, is applied to the change-over circuit 8 so as to take out the output of the output terminal COM2 from the analog multiplexer 3. Therefore, the outputs of the photo-detecting elements $P_{21}-P_{2n}$ are taken out in this order. Thus, the output terminal COM1 is selected for the odd numbered block, and, on the contrary, the output terminal COM2 is selected for the even numbered block, so that time-series signals in the order of arrangement of the photo-detecting elements can be obtained.

The output of the change-over circuit for controlling the analog multiplexer is not limited to the use of the output signals of the CR terminals as described above. A signal synchronized with a signal for forming a gate signal may be taken out for the drive circuit, and further alternatively it suffices that a signal having the same timing as that of a change-over signal of FIG. 6 is formed by utilizing any suitable signal.

Figure 4:
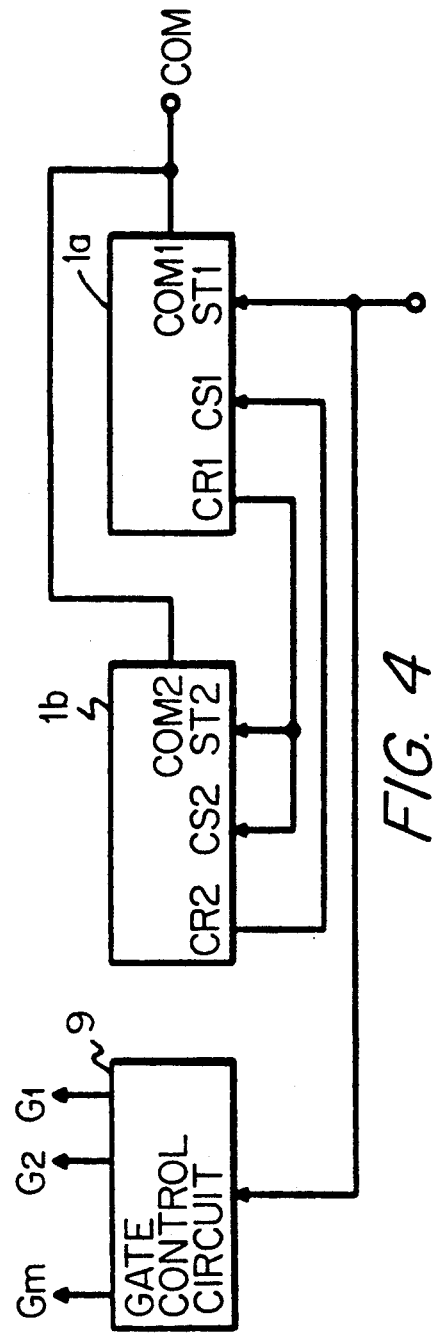
FIG. 4 is a block diagram showing another embodiment using the read-out circuits of FIG. 1.

FIG. 4 is a block diagram for explaining another embodiment in which all the outputs of the photo-detecting elements are made to be time-series signals by using the read-out circuits 1a and 1b in the circuit of FIG. 1. In FIG. 4, portions corresponding to those of FIG. 3 are correspondingly referenced, and description thereof is omitted. In this embodiment, the operation of the IC constituting the read-out circuit is changed over in the inside of the image sensor and therefore it is not necessary to provide a change-over portion outside the image sensor.

In this embodiment using the IC explained in FIG. 5 as each of the read-out circuits 1a and 1b, the output terminal CR1 of the read-out circuit 1a is connected to the input terminals ST2 and CS2 of the read-out circuit 1b, and the output terminal CR2 of the read-out circuit 1b is connected to the input terminal CS1 of the read-out circuit 1a. The output terminals COM1 and COM2 are commonly connected so as to form the output terminal COM. The connection of the switching elements to the common output lines $S_1, S_2, \ldots, S_n$ and the input terminals IN of the read-out circuits 1a and 1b is the same as that explained in FIG. 3. In this embodiment, the read-out circuits 1a and 1b are actuated to operate alternately.

Figure 7:
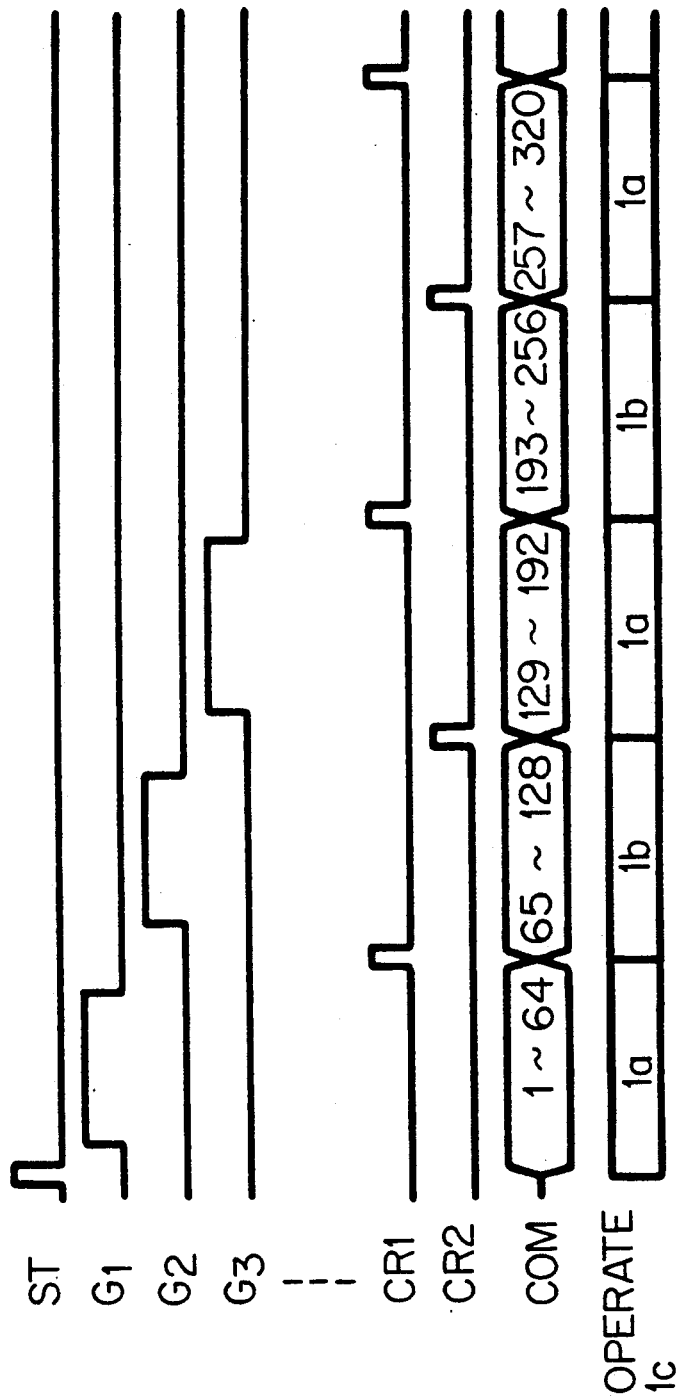
FIG. 7 is a time chart for explaining the operation of the embodiment of FIG. 4.

The operation will be described with reference to the timing-chart of FIG. 7. When a start pulse is applied to the input terminal ST1 of the read-out circuit 1a, the read-out circuit 1a starts to operate. Further, the start pulse is applied to a gate control circuit 9 to thereby generate a gate pulse. First, a gate signal $G_1$ is produced to thereby apply the outputs of photo-detecting elements of a first block to the common output lines $S_1, S_2, \ldots, S_n$ through the switching elements so that data of the first block are transferred. The read-out circuit 1b, however, does not operate, and therefore the output terminal COM2 thereof is held in the high-impedance state, so that the outputs of the photo-detecting elements of the first block are obtained from the output terminal COM1 of the read-out circuit 1a as a time-series signal. Upon completion of reading of the first block by the read-out circuit 1a, an output is produced from the output terminal CR1 and transferred to the input terminals ST2 and CS2 of the read-out circuit 1b. As a result, the read-out circuit 1b starts to operate. Since a gate signal $G_2$ for transferring data of a second block is produced from the gate control circuit 9 at this time, the outputs of photo-detecting elements of the second block are obtained from the output terminal COM2 of the read-out circuit 1b in the order of arrangement in the form of a time-series signal. Upon completion of the reading of the second block by the read-out circuit 1b, an output is produced from the output terminal CR2 and transferred to the input terminal CS1 of the read-out circuit 1a, so that the read-out circuit 1a starts to operate again. By repeating the above operation, the read-out circuit 1a operates at the time of transfer of data of the odd numbered block, and, on the contrary, the read-out circuit 1b operates at the time of transfer of data of the even numbered block, so that a time-series signal corresponding to a train of picture elements are obtained in the output line COM.

The operation may be performed in such a manner that a reset signal is led into the clear terminal CL upon completion of reading of one line to thereby stop reading and data processing is performed and that reading of the next line is started in response to a start pulse.

As seen from the foregoing description, according to the present invention, there is such an effect that the circuit configuration is not complicated and it is not necessary to provide any excess memory because the outputs of the photo-detecting elements are processed in an analog state by using two read-out circuits to thereby make it possible to read data in the form of a time-series signal corresponding to a train of picture elements.

What is claimed is:

1. A reading apparatus comprising:
   a photo-detecting element array constituted by a plurality of photo-detecting element blocks each constituted by a plurality of photo-detecting elements being arranged in an order;
   switching elements, each coupled to one of a plurality of photo-detecting elements and each having an output line, for transferring charges generated in the corresponding photo-detecting elements;
   wiring connecting said output lines of one of each said blocks to the output lines of an adjacent block, wherein the output lines of one of each said blocks are connected to the output lines of the adjacent block that are in a mirror-image order;
   two read-out circuits, simultaneously driven by a drive circuit, for reading out the charges generated by said photo-detecting elements, one of said read-out circuits being connected to a one end of said wirings for reading out the charges in the order of arrangement in the one photo-detecting element block, and the other read-out circuit being connected to an opposite end of said wirings for reading out the charges in the reverse order of arrangement in the adjacent photo-detecting element block; and
   selecting circuit for selecting one of outputs of said two read-out circuits block by block of the photo-detecting elements.

2. A reading apparatus as claimed in claim 1, wherein said wirings never cross each other.

3. A reading apparatus as claimed in claim 1, wherein said wirings are arranged as meander shaped.

4. A reading apparatus as claimed in claim 1, further comprising synthesizing means, connected to said selecting circuit, for designating the output of said two read-out circuits through said selecting circuit.

* * * * *